(12) United States Patent
Chang et al.

(10) Patent No.: US 8,097,346 B2
(45) Date of Patent: Jan. 17, 2012

(54) BARRIER FILMS CONTAINING MICROLAYER STRUCTURES

(75) Inventors: Moh-Ching Oliver Chang, Lake in the Hills, IL (US); Michael Tung-Kiung Ling, Vernon Hills, IL (US); Yuanpang S. Ding, Libertyville, IL (US)

(73) Assignees: Baxter International Inc., Deerfield, IL (US); Baxter Healthcare S.A., Glattpark (Opfikon) (CH)

( * ) Notice: Subject to any disclaimer, the term of this patent is extended or adjusted under 35 U.S.C. 154(b) by 430 days.

(21) Appl. No.: 12/342,343

(22) Filed: Dec. 23, 2008

(65) Prior Publication Data
US 2009/0169853 A1 Jul. 2, 2009

Related U.S. Application Data

(60) Provisional application No. 61/017,103, filed on Dec. 27, 2007.

(51) Int. Cl.
*B32B 27/32* (2006.01)
*B32B 17/10* (2006.01)
*B32B 27/00* (2006.01)
*B32B 27/08* (2006.01)

(52) U.S. Cl. ........ 428/500; 428/220; 428/332; 428/339; 428/475.8; 428/476.1; 428/515

(58) Field of Classification Search .......... None
See application file for complete search history.

(56) References Cited

U.S. PATENT DOCUMENTS

| | | | |
|---|---|---|---|
| 3,579,416 A | 5/1971 | Schrenk et al. | |
| 3,759,647 A | 9/1973 | Turner et al. | |
| 4,661,303 A | 4/1987 | Chum et al. | |
| 4,873,037 A | 10/1989 | Chau et al. | |
| 5,451,449 A | 9/1995 | Shetty et al. | |
| 6,071,450 A | 6/2000 | Topolkaraev et al. | |
| 6,082,025 A | 7/2000 | Bonk et al. | |
| 6,127,026 A | 10/2000 | Bonk et al. | |
| 6,261,674 B1 | 7/2001 | Branham et al. | |
| 6,582,786 B1 * | 6/2003 | Bonk et al. | 428/35.7 |
| 6,586,354 B1 | 7/2003 | Topolkaraev et al. | |
| 6,680,114 B2 | 1/2004 | Kody et al. | |
| 7,179,952 B2 | 2/2007 | Vukos et al. | |
| 7,303,642 B2 | 12/2007 | Topolkaraev | |
| 2004/0089412 A1 | 5/2004 | Topolkaraev | |
| 2004/0213928 A1 | 10/2004 | Sebastian et al. | |
| 2004/0219364 A1 | 11/2004 | Shirk et al. | |
| 2005/0049566 A1 | 3/2005 | Vukos et al. | |
| 2005/0090616 A1 | 4/2005 | Dias et al. | |
| 2008/0038533 A1 | 2/2008 | Best et al. | |

FOREIGN PATENT DOCUMENTS

| | | |
|---|---|---|
| EP | 0 355 982 | 2/1990 |
| WO | 9933651 | 7/1999 |
| WO | 9933654 | 7/1999 |
| WO | 00 76765 | 12/2000 |
| WO | 2006047374 | 5/2006 |

OTHER PUBLICATIONS

Schuman et al., "Solid state structure and melting behavior of interdiffused polyethylenes in microlayers," Polymer, Elsevier Science Publishers B.V. GB, vol. 40, No. 26, Dec. 1, 1999, pp. 7373-7385, XP004362747.

Im et al., "Coextruded Microlayer Film and Sheet," Journal of Plastic Film & Sheeting, vol. 4, Apr. 1, 1988, pp. 104-115, XP000889966.

Poon et al., "Adhesion of polyethylene blends to polypropylene," Polymer, Elsevier Science Publishers B.V., GB, vol. 45, No. 3, Feb. 1, 2004, pp. 893-903, XP004483675.

International Search Report dated Mar. 26, 2009 (7 pgs.).

Written Opinion of the International Searching Authority dated Mar. 26, 2009 (8 pgs.).

* cited by examiner

*Primary Examiner* — Sheeba Ahmed
(74) *Attorney, Agent, or Firm* — K&L Gates LLP

(57) ABSTRACT

Films containing microlayer structures are provided. In a general embodiment, the present disclosure provides a film containing a first microlayer of a heat resistant polymer and a second microlayer of a barrier polymer having a heat distortion temperature ranging between about 50° C. and about 120° C. attached to the first microlayer. Each of the first microlayer and the second microlayer has a thickness ranging from about 0.01 microns to about 10 microns.

24 Claims, 1 Drawing Sheet

BARRIER FILMS CONTAINING MICROLAYER STRUCTURES

CROSS REFERENCE TO RELATED APPLICATIONS

This application claims the benefit of U.S. Provisional Patent Application Ser. No. 61/017,103 filed on Dec. 27, 2007, the entire disclosure of which is hereby incorporated by reference.

BACKGROUND

The present disclosure relates to polymer films. More specifically, the present disclosure relates to autoclavable polymer films containing microlayer structures.

Coextruded films are widely used in a variety of industries, which include containers for food or medical solution packaging. These coextruded films should provide toughness or ability to resist damage in use or transport. The films can also have the ability to make both a peel seal at the desired strength to suit the application as well as a permanent seal to permanently enclose a container. Ideally, the films should provide a barrier to gases such as oxygen, carbon dioxide or water vapor in order to maintain the stability of contained solutions. In addition, for medical applications, the film should be able to withstand moist heat sterilization at 121° C., maintaining the film dimension and strength.

SUMMARY

The present disclosure relates to polymer films containing microlayer structures. In a general embodiment, the present disclosure provides a film containing a first microlayer of a heat resistant polymer and a second microlayer of a barrier polymer having a heat distortion temperature ranging between about 50° C. and about 120° C. attached to the first microlayer. Each of the first microlayer and the second microlayer has a thickness ranging from about 0.01 microns to about 10 microns. In an embodiment, the first microlayer and the second microlayer exclude polyvinyl chloride (PVC). The microlayers are capable of being autoclaved at 121° C. without wrinkling while having superb clarity and high toughness.

In an embodiment, the film contains a contiguous structure of at least 10 alternating layers of the first microlayer and the second microlayer. In another embodiment, the film contains a contiguous structure of about ten to about two thousand layers of at least one of the first microlayers and at least one of the second microlayers in any suitable order.

In an embodiment, the heat resistant polymer is one or more of polypropylene homopolymers, polypropylene copolymers, high density polyethylenes, cyclic olefin copolymers, or a combination thereof. In another embodiment, the heat resistant polymer is a maleic anhydride modified polypropylene or maleic anhydride high density polyethylene. In an embodiment, the barrier polymer is a rubber modified copolymer of methyl acrylate and acrylonitrile.

In another embodiment, the present disclosure provides a film containing a skin layer, a core layer, and a seal layer. The core layer contains a first microlayer of a heat resistant polymer and a second microlayer of a barrier polymer having a heat distortion temperature ranging between about 50° C. and about 120° C. attached to the first microlayer, each of the first microlayer and the second microlayer having thickness ranging from about 0.01 microns to about 10 microns. The skin layer and the seal layer can contain a material such as a polypropylene copolymers, polypropylene homopolymers, nylons, styrene-ethylene-butylene-styrene block copolymers, copolyester ether block copolymers, or a combination thereof. In another embodiment, the present disclosure provides a film comprising a first skin layer, a core layer, and a second skin layer.

In an alternative embodiment, the present disclosure provides a method of making a film. The method comprises coextruding a first microlayer of a heat resistant polymer and a second microlayer of a barrier polymer having a heat distortion temperature ranging between about 50° C. and about 120° C. attached to the first microlayer. Each of the first microlayer and the second microlayer has thickness ranging from about 0.01 microns to about 10 microns.

An advantage of the present disclosure is to provide improved barrier films that are autoclavable without wrinkling.

Another advantage of the present disclosure is to provide improved non-PVC films.

Yet another advantage of the present disclosure is to provide improved core layers for polymer films.

Still another advantage of the present disclosure is to provide improved methods of making non-PVC films that are autoclavable without wrinkling.

Additional features and advantages are described herein, and will be apparent from the following Detailed Description and the figures.

DETAILED DESCRIPTION

The present disclosure relates to autoclavable polymer films containing microlayer structures. The microlayer structures can contain combinations of ultra-thin polymer layers and can be designed to provide improved characteristics to the polymer films. The microlayer structures can be used as optical films that selectively filter or reflect particular wavelengths of light. The autoclavable films can also have a toughness or ability to resist damage in use or transport and provide an improved barrier to gases such as oxygen, carbon dioxide, or water vapor in order to maintain the stability of contained solutions.

Applicants have surprisingly found that barrier polymer materials having a heat distortion temperature below that of standard autoclaving temperatures (e.g. 121° C.) can successfully be used to produce autoclavable barrier films when used as part of a microlayer structure. For example, for medical applications involving moist heat sterilization, the films withstand autoclaving at 121° C. while maintaining the film dimension, strength and geometry without cosmetic wrinkling.

Figure 1:
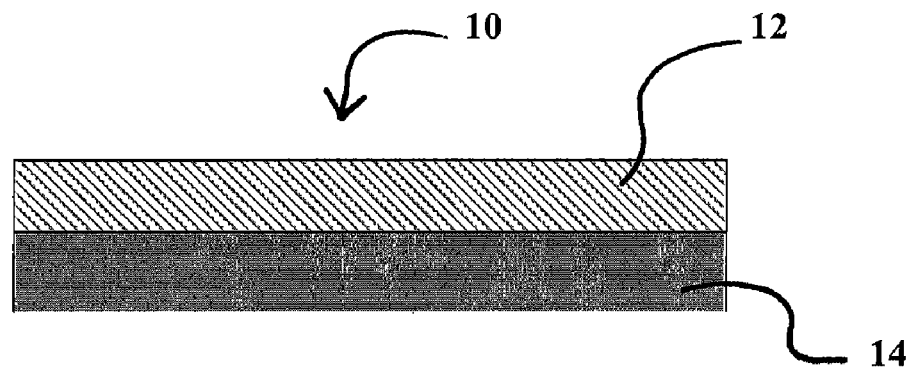
FIG. 1 is a cross-sectional view of a microlayer structure in an embodiment of the present disclosure.
Figure 2:
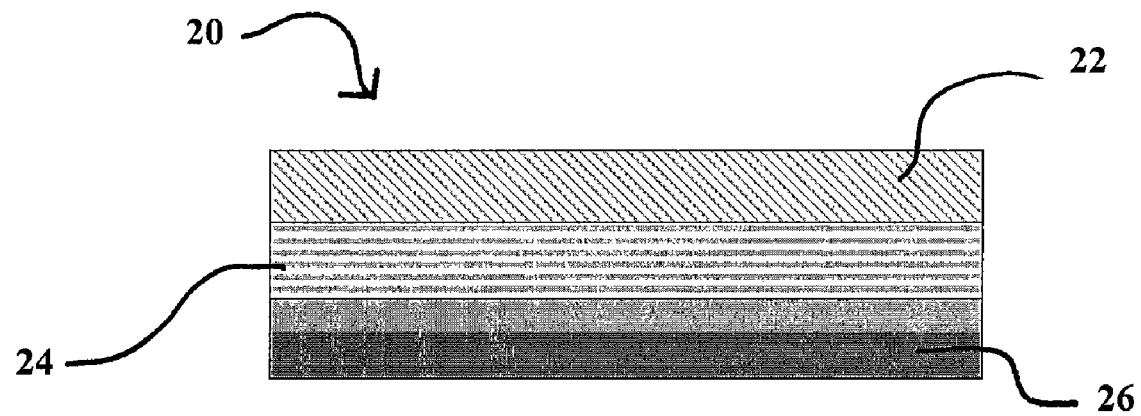
FIG. 2 is a cross-sectional view of a film comprising a microlayer structure in an embodiment of the present disclosure.

In a general embodiment illustrated in FIG. 1, the present disclosure provides an autoclavable film 10 containing a first microlayer 12 of a heat resistant polymer and a second microlayer 14 of a barrier polymer having a heat distortion temperature ranging between about 50° C. and about 120° C. attached to the first microlayer 12. The first microlayer 12 and the second microlayer 14 each has a thickness ranging from about 0.01 microns to about 10 microns.

In alternative embodiments, the barrier polymer can have a heat distortion temperature lower than that of standard autoclave temperatures including, for example, less than about 120° C., 115° C., 110° C., 105° C., 100° C., 95° C., 90° C., 85° C., 80° C., 75° C., 70° C., 65° C., 60° C., and the like. In an embodiment, the barrier polymer has a heat distortion temperature ranging between about 60° C. and about 120° C. In an embodiment, the barrier polymer has a heat distortion temperature ranging between about 60° C. and about 100° C.

In an embodiment, the autoclavable film contains a contiguous structure of at least 10 alternating layers of the first microlayer and the second microlayer. The autoclavable film can further contain a contiguous structure of about ten to about two thousand alternating layers of the first microlayer and the second microlayer. In another embodiment, the autoclavable film can contain the first microlayer and the second microlayer in any amount and in any suitable order. For example, the film can contain a contiguous structure of about ten to about two thousand layers of at least one of the first microlayers and at least one of the second microlayers in any suitable order. In an embodiment, the first microlayer and/or the second microlayer exclude any PVCs.

The heat resistant polymer can be, for example, one or more of polypropylene homopolymers, polypropylene copolymers, high density polyethylene, cyclic olefin copolymers, or a combination thereof. In another embodiment, the heat resistant polymer comprises a maleic anhydride modified polypropylene or maleic anhydride modified polyethylene. In a preferred embodiment, the barrier polymer comprises a rubber modified copolymer of methyl acrylate and acrylonitrile.

Suitable polypropylene copolymers include those sold by Flint Hills Resources under the HUNTSMAN tradename and Borealis under the BOREALIS and TOTAL tradenames. Suitable polypropylene homopolymers include those sold by Flint Hills Resources under the HUNTSMAN tradename.

Many polymers with high gas barrier capability such as, for example, MXD6 nylon, nano-clay filled MXD6 (e.g. IMPERM® 105 by Nanocor), polyvinylidene chloride (PVDC) or amorphous nylon are rigid and do not have the required toughness to resist damage in use or transport. One exception is the BAREX® copolymer (supplier: Ineos), which is a rubber modified copolymer of methyl acrylate and acrylonitrile with about 60% acrylonitrile content.

BAREX® 210 and 218 copolymers with Izod impact strengths of 5.0 and 9.0 ft. lb/in, respectively, have a good film toughness. The $CO_2$ barrier of BAREX® 210 and 218 copolymers (0.45 and 0.6 $cm^3 \cdot mm/m^2 \cdot day \cdot atm$ [room temperature (RT) and 100% relative humidity (RH)], respectively) are comparable to those of amorphous nylon (GRIVORY® G21: 2.0 [RT, 85% RH]) and IMPERM® 105 (0.15 [RT, 60% RH]). However, the BAREX® copolymers have a low heat distortion temperature (70-80° C. at 66 psi load) with a glass transition temperature of about 55-65° C. and cannot withstand heating under autoclave conditions (e.g. 121° C. or higher) without distorting. This distortion can adversely affect containers made from BAREX® copolymers that are autoclaved or subjected to high sterilization temperatures. In addition, the BAREX® copolymers cannot be processed at above 210° C. without some degradation.

In an embodiment, the present disclosure provide a microlayer structure containing alternating layer of maleated polypropylene (PP) and the BAREX® copolymer as a core layer of a co-extruded film to achieve a desired autoclavability while having good gas barrier and toughness properties. Maleated PP, which has melting point >=140° C., can improve the heat resistance through the alternating micro layer structure. The components of the co-extruded film can be selected to be processible at lower than 210° C. while obtaining good film quality with a high throughput.

The microlayer films can further contain one or more additional layers in addition to the first and second microlayers. The additional layer(s) can contain, for example, polypropylene, thermoplastic elastomer or a combination thereof. Any suitable tie layers can be used to attach the additional layers to the surfaces of the microlayer structure containing the first and second microlayers.

In an alternative embodiment, the present disclosure provides a film 20 containing a skin layer 22, a core layer 24 attached to the skin layer 22, and a seal layer 26 attached to the core layer 24. The core layer 24 contains a first microlayer of a heat resistant polymer and a second microlayer of a barrier polymer attached to the first microlayer. The first microlayer and the second microlayer each have a thickness ranging from about 0.01 microns to about 10 microns. Any suitable tie layers can be used to connect the skin layer 22 and the seal layer 26 to the core layer 24.

The skin layer and/or the seal layer can also be in the form of one or more microlayers each having a thickness ranging between about 0.01 microns and about 10 microns. In another embodiment, the skin layer and/or the seal layer has a thickness greater than about 10 microns. In addition, the seal layer can have suitable characteristics for use as a peel seal layer or a permanent seal layer, for example, as part of a multi-chambered container.

In an alternative embodiment, the present disclosure provides a film containing a first skin layer, a core layer attached to the first skin layer, and a second skin layer attached to the core layer. The core layer comprises the microstructure layer as described in previously mentioned embodiments. The first skin layer and/or the second skin layer can also be in the form of one or more microlayers each having a thickness ranging between about 0.01 microns and about 10 microns. In an embodiment, the first skin layer and/or the second skin layer has a thickness greater than about 10 microns.

The skin layers can contain any suitable skin material such as one or more polypropylene copolymers, polypropylene homopolymers, high density polyethylenes, nylons, styrene-ethylene-butylene-styrene block copolymers, styrene-ethylene-propylene-styrenes, styrene-ethylene-ethylene-styrenes, copolyester ethers, or a combination thereof. The seal layers can contain any suitable sealable material such as one or more polypropylene copolymers, polypropylene homopolymers, nylons, styrene-ethylene-butylene-styrene block copolymers, copolyester ethers, or a combination thereof. The films can further include one or more tie layers that attach at least one of the skin layer and the seal layer to the core layer containing the microlayers.

Suitable polypropylene copolymers include those sold by Flint Hills Resources under the HUNTSMAN tradename and Borealis under the BOREALIS and TOTAL tradenames. Suitable polypropylene homopolymers include those sold by Flint Hills Resources under the HUNTSMAN trade name. Suitable styrene-ethylene-butylene-styrene block copolymers include those sold by Kraton Polymers under the KRATON tradename. Suitable nylons include those sold by EMS-Grivory under the GRIVORY and GRILON trade names.

In an alternative embodiment, the present disclosure provides a method of making a film. The method includes the step of coextruding a first microlayer of a heat resistant polymer and a second microlayer of a barrier polymer having a heat distortion temperature ranging between about 50° C. and about 120° C. attached to the first microlayer. Each of the first microlayer and the second microlayer have a thickness ranging from about 0.01 microns to about 10 microns. The first and second microlayers can be extruded using any suitable process such as microextrusion techniques. The microlayer structures can also be coextruded with additional layers such as skin or seal layers using any suitable process.

EXAMPLES

By way of example and not limitation, the following examples are illustrative of various embodiments of the present disclosure. The percentages described herein are weight percentages unless specified otherwise.

Example 1

The films shown in Table 1 have a microlayer thickness of 0.6 to 1.2 microns.

TABLE 1

Film containing microlayer structure with A/B structure and skin layers

| 66 microns | 10.2 microns | Total thickness = 27.9 microns (2 × 16 = 32 layers) | | 10.2 microns | 66 microns |
|---|---|---|---|---|---|
| Skin | Tie | A | B | Tie | Skin |
| "8020" | Admer 551 | (2) Admer 551 | (1) Barex 218 | Admer 551 | "8020" |

The key properties of those polymers used in the above table are listed in Table 2. One of the skin layers can be replaced with a peel seal layer to have a peel-sealability.

TABLE 2

Key features of polymers used in the film structures of Table 1

| Material | Chemistry | sp. gr. | Tm, ° C. | MFI, g/10 min (190° C., 2.16 kg) | MFI, g/10 min (230° C., 2.16 kg) |
|---|---|---|---|---|---|
| "8020" | 80% Huntsman 43M5A PP/ 20% Kraton G1643 SEBS | — | 148 | — | — |
| Huntsman 43M5A | Co-PP | 0.9 | 148 | — | 4.5 |
| Admer 551 | Maleated Co-PP | 0.89 | 145 | — | 5.2 |

From Table 1, the A/B thickness represents the combined thickness of a single microlayer A and microlayer B added together.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An autoclavable film comprising:
a first microlayer of a heat resistant polymer selected from the group consisting of maleic anhydride modified polypropylenes, maleic anhydride modified high density polyethylenes, and combinations thereof, and
a second microlayer of a barrier polymer having a heat distortion temperature ranging between about 50° C. and about 120° C. attached to the first microlayer, each of the first microlayer and the second microlayer having a thickness ranging from about 0.01 microns to about 10 microns.

2. The autoclavable film of claim 1, wherein the barrier polymer has a heat distortion temperature ranging between about 60° C. and about 120° C.

3. The autoclavable film of claim 1, wherein the barrier polymer has a heat distortion temperature ranging between about 60° C. and about 100° C.

4. The autoclavable film of claim 1 comprising a contiguous structure of at least 10 alternating layers of the first microlayer and the second microlayer.

5. The autoclavable film of claim 1 comprising a contiguous structure of about ten to about two thousand alternating layers of the first microlayer and the second microlayer.

6. The autoclavable film of claim 1 comprising a contiguous structure of about ten to about two thousand layers of at least one of the first microlayers and at least one of the second microlayers.

7. The autoclavable film of claim 1, wherein the barrier polymer comprises a rubber modified copolymer of methyl acrylate and acrylonitrile.

8. The autoclavable film of claim 1 further comprising at least one additional layer other than the first and second microlayers.

9. The autoclavable film of claim 8, wherein the one additional layer comprises a material selected from the group consisting of polypropylene, thermoplastic elastomer and combinations thereof.

10. The autoclavable film of claim 9, wherein the thermoplastic elastomer comprises a styrene and hydrocarbon block copolymer.

11. The autoclavable film of claim 8, wherein the at least one additional layer comprises a seal layer.

12. The autoclavable film of claim 8, wherein the at least one additional layer comprises a tie layer and an exterior layer.

13. The film of claim 1, wherein the first microlayer and the second microlayer exclude polyvinyl chloride.

14. An autoclavable film comprising:
a skin layer;
a core layer comprising a first microlayer of a heat resistant polymer selected from the group consisting of maleic anhydride modified polypropylenes, maleic anhydride modified high density polyethylenes, and combinations thereof and a second microlayer of a barrier polymer having a heat distortion temperature ranging between about 50° C. and about 120° C. attached to the first microlayer, each of the first microlayer and the second microlayer having a thickness ranging from about 0.01 microns to about 10 microns; and
a seal layer.

15. The autoclavable film of claim 14, wherein the skin layer comprises material selected from the group consisting of polypropylene copolymers, polypropylene homopolymers, high density polyethylenes, nylons, styrene-ethylene-butylene-styrene block copolymers, styrene-ethylene-propylene-styrenes, styrene-ethylene-ethylene-styrenes, copolyester ethers, and combinations thereof.

16. The autoclavable film of claim 14, wherein the peel seal layer comprises material selected from the group consisting of polypropylene copolymers, polypropylene homopolymers, nylons, styrene-ethylene-butylene-styrene block copolymers, copolyester ether block copolymers, and combinations thereof.

17. The autoclavable film of claim 14 comprising a contiguous structure of at least 10 alternating layers of the first microlayer and the second microlayer.

18. The autoclavable film of claim 14 comprising a contiguous structure of about ten to about two thousand layers of at least one of the first microlayers and at least one of the second microlayers.

19. The autoclavable film of claim 14, wherein the barrier polymer comprises a rubber modified copolymer of methyl acrylate and acrylonitrile.

20. The autoclavable film of claim 14, wherein the first microlayer and the second microlayer exclude polyvinyl chloride.

21. The autoclavable film of claim 14 further comprising at least one tie layer attaching the skin layer to the core layer.

22. The autoclavable film of claim 14 further comprising at least one tie layer attaching the seal layer to the core layer.

23. An autoclavable film comprising:
a first skin layer;
a core layer comprising a first microlayer of a heat resistant polymer selected from the group consisting of maleic anhydride modified polypropylenes, maleic anhydride modified high density polyethylenes, and combinations thereof and a second microlayer of a barrier polymer having a heat distortion temperature ranging between about 50° C. and about 120° C. attached to the first microlayer, each of the first microlayer and the second microlayer having a thickness ranging from about 0.01 microns to about 10 microns; and
a second skin layer.

24. A method of making an autoclavable film, the method comprising coextruding a first microlayer of a heat resistant polymer selected from the group consisting of maleic anhydride modified polypropylenes, maleic anhydride modified high density polyethylenes, and combinations thereof and a second microlayer of a barrier polymer having a heat distortion temperature ranging between about 50° C. and about 120° C. attached to the first microlayer, each of the first microlayer and the second microlayer having a thickness ranging from about 0.01 microns to about 10 microns.

* * * * *